United States Patent [19]

Jackson et al.

[11] Patent Number: 5,064,935
[45] Date of Patent: Nov. 12, 1991

[54] CONTINUOUS PROCESS FOR PREPARING POLY(BUTYLENE TEREPHTHALATE) OLIGOMER OR POLY(BUTYLENE ISOPHTHALATE) OLIGOMER

[75] Inventors: Roy Jackson; David J. Lowe; Clare A. Stewart, all of Wilmington, Del.

[73] Assignee: E. I. duPont de Nemours and Company, Wilmington, Del.

[21] Appl. No.: 561,468

[22] Filed: Aug. 1, 1990

[51] Int. Cl.$^5$ .............................................. C08G 63/02
[52] U.S. Cl. ..................................... 528/272; 528/279
[58] Field of Search ............................... 528/272, 279

[56] References Cited

U.S. PATENT DOCUMENTS 4,289,871 9/1981 Rowan et al. ........................ 528/309
4,289,895 9/1981 Burkhardt et al. ................... 560/92
4,499,261 2/1985 Heinze et al. ........................ 528/279

Primary Examiner—Harold D. Anderson
Assistant Examiner—T. Mosley

[57] ABSTRACT

Economic and efficient process for preparing an oligomer of poly(butylene terephthalate) or an oligomer of poly(butylene isophthalate) from a transesterification reaction mass by using a countercurrent column reactor system wherein the transesterification reaction mass is fed into the countercurrent column reactor and continuously flows downward while simultaneously a heated inert gas stream continuously flows upward to scrub out volatiles from the transesterification reaction mass, thereby yielding from the bottom of the countercurrent column reactor an oligomer of poly(butylene terephthalate) or an oligomer of poly(butylene isophthalate) suitable for use in a polycondensation reaction. Butanediol is recycled throughout the process through an absorber column.

14 Claims, 1 Drawing Sheet

CONTINUOUS PROCESS FOR PREPARING POLY(BUTYLENE TEREPHTHALATE) OLIGOMER OR POLY(BUTYLENE ISOPHTHALATE) OLIGOMER

BACKGROUND OF THE INVENTION

The demand for poly(butylene terephthalate), hereinafter PBT, copolyetherester elastomers containing PBT hard segments, and poly(butylene isophthalate), hereinafter PBI, continues to grow.

There are numerous patents directed to processes for the continuous preparation of PBT from dimethyl terephthalate and 1,4-butanediol, hereinafter DMT and BDO respectively. Typically, these continuous processes employ a first transesterification stage wherein DMT and a substantial excess of BDO are contacted in the presence of a transesterification catalyst and reacted at around atmospheric pressure and at temperatures of 170°-200° C. During the transesterification reaction, methanol is formed as a by-product. In typical continuous processes, the bulk of the methanol thus formed is removed overhead through a fractionating column while any unreacted BDO is retained in the reaction mixture. The first transesterification stage is usually followed by two or more reaction stages operating at reduced pressure wherein the removal of methanol formed as a by-product of the transesterification reaction is completed and sufficient precondensation to form an oligomer (or prepolymer) suitable for feed to a continuous polycondensation reactor is achieved.

A recent disclosure of such a continuous process for preparing PBT from DMT and BDO is provided by U.S. Pat. No. 4,499,261 to Heinze et al. In the specific example of this reference, two transesterification stages and two precondensation stages are used prior to sending the resulting oligomer (or prepolymer) to the final polycondensation reactor. The first transesterification stage is operated at a pressure of 1.3 bar. The next three stages required to prepare the oligomer (or prepolymer) are operated at subatmospheric pressure. The total residence time of the reactants in the four stages prior to polycondensation is 240 minutes. A 30% molar excess of BDO relative to DMT is used. The loss of BDO resulting from the formation of tetrahydrofuran, hereinafter THF, is stated to be 5.1 moles per 100 moles of DMT fed.

While the above reference indicates that the loss of BDO to THF in the process therein is substantially less than encountered in earlier processes, a loss of 5.1 moles of BDO per 100 moles of DMT still represents a serious loss of an expensive raw material, especially when it is realized that the desired product is being manufactured at levels of tens of million pounds a year.

Beyond this yield loss, the process of the reference inherently represents a source of environmental contamination by virtue of the fact that several stages prior to the final polycondensation (i.e., precondensation stages) are operated at reduced pressure. This is a problem shared by prior continuous processes, along with batch processes, in general. Operation of the precondensation stages at reduced pressure on a commercial scale generally requires vacuum sources, such as, for example, steam jets or vacuum pumps. When a vacuum source is used, environmental contamination can occur because some of the volatile organics being removed in the precondensation stages cannot be fully condensed. The organic volatiles can then be emitted into the environment from the vacuum source. Accordingly, when vacuum operations are used in continuous reaction process, and also in batch processes, additional measures are necessary to protect the environment from the volatile organics that may be emitted by the vacuum source.

Thus, while the continuous preparation of PBT from BDO and DMT is well advanced as a result of numerous extensive investigations, there is still a need for improvement with regard to utilization of BDO and with regard to contamination of the environment with volatile organics. Likewise, the same type of improvements are desired in preparing PBI and copolymers based upon PBT or PBI.

SUMMARY OF THE INVENTION

The loss of BDO to THF and environmental contamination by volatile organics are both substantially reduced by an improved continuous process wherein a countercurrent column reactor system is used for the preparation of PBT oligomer or PBI oligomer (or prepolymer) from a reaction mass formed by a transesterification reaction between BDO and a dimethyl ester, said ester being selected from dimethyl isophthalate, DMT, and mixtures thereof, and in the presence of a transesterification catalyst.

More specifically, in the present invention, PBT oligomer or PBI oligomer (or prepolymer) is prepared by an improved continuous process comprising the steps of (1) continuously feeding a reaction mass prepared from a transesterification reaction between BDO and a dimethyl ester in the presence of a transesterification catalyst and having a dimethyl ester conversion of 50-95%, into the top part of a heated countercurrent column reactor having internal plates, (2) continuously feeding an inert gas stream having a temperature of at least 225° C. into the bottom part of the countercurrent column reactor and allowing it to flow upwards through the countercurrent column reactor while the reaction mass simultaneously flows downward at a rate such that said reaction mass has a residence time of at least 5 minutes in the countercurrent column reactor, (3) continuously feeding the inert gas stream, which now also contains water, methanol, THF, and BDO, from the top part of the countercurrent column reactor into the bottom part of an absorber while also continuously feeding butanediol at a temperature lower than that of the incoming inert gas feed stream into the top part of the absorber, (4) continuously passing the inert gas stream upwards through the absorber and into a compressor while simultaneously and continuously passing the butanediol downward through the absorber and into a transesterification process or back to a butanediol feed line, and (5) collecting an oligomer (or prepolymer) of PBT or an oligomer of PBI from the bottom part of the countercurrent column reactor.

The PBT or PBI oligomer or prepolymer can be fed into conventional polycondensation processes to form PBI polymer or PBT polymer. It also can be mixed with a poly(alkylene oxide) glycol and introduced into a polycondensation reaction to form a copolyetherester.

In a preferred embodiment, and specifically for the preparation of PBT oligomer, even greater reduction in the loss of BDO to THF can be achieved if operation of the transesterification stage which provides the reaction mass feed for the countercurrent column is adjusted such that the reaction mass feed from said prior transesterification reaction stage is the reaction product of DMT and BDO in the presence of a transesterification catalyst, wherein said BDO is added in a molar excess of 10% or less.

FIGURE

FIG. 1 is a flow sheet showing equipment arrangement and material flows for the improved process of this invention. The equipment arrangement shown is provided only to facilitate description of the invention and is not meant to limit the scope of the invention as defined by the claims.

DETAILED DESCRIPTION OF THE INVENTION

Figure 1:
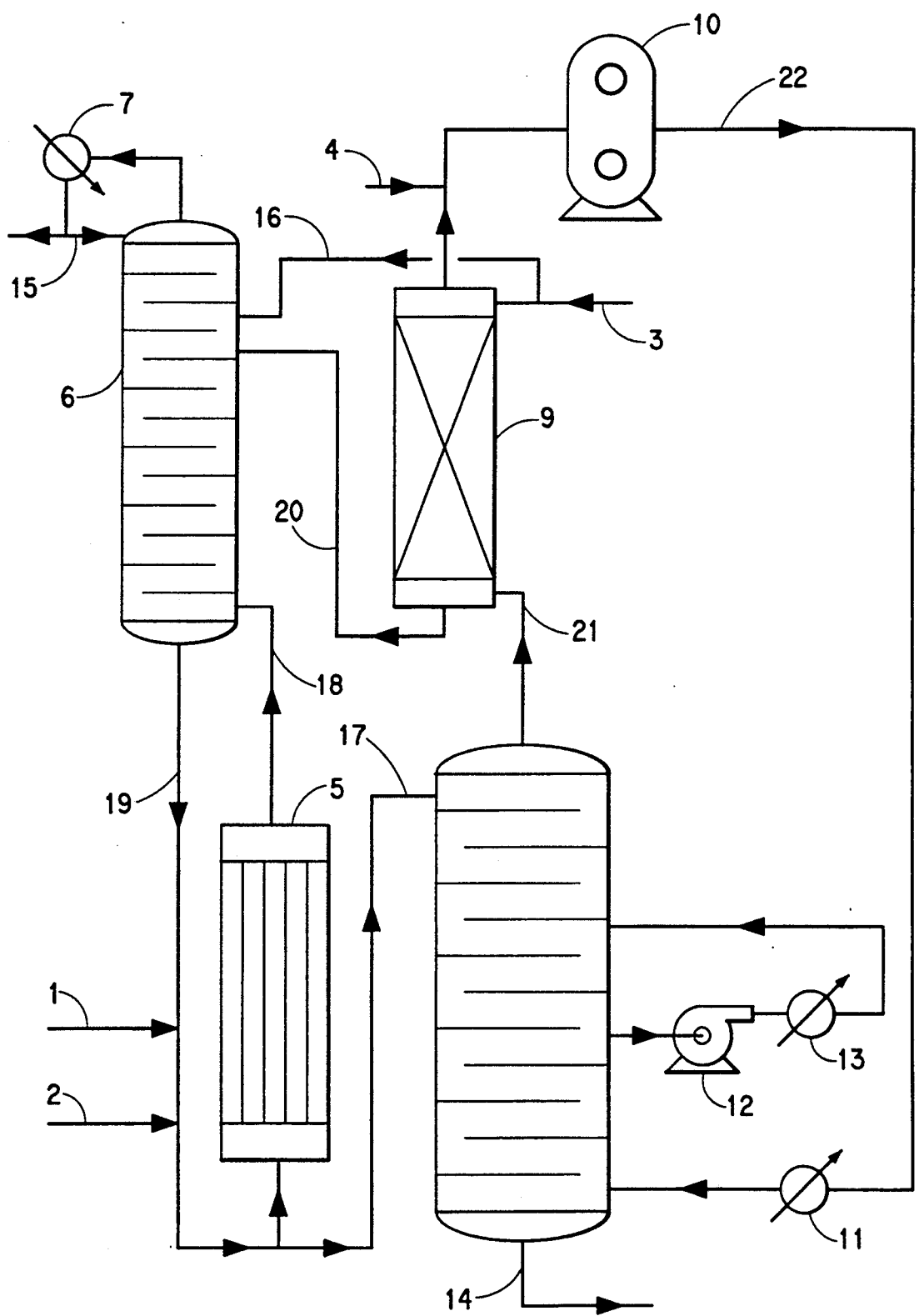

The improved process of the present invention makes use of a continuous countercurrent column reactor system to convert a reaction mass from a prior (i.e., upstream) transesterification reaction stage into an oligomer (or prepolymer) of PBT or an oligomer of PBI suitable for feed to a continuous polycondensation stage.

1. Prior Transesterification Stage

In the prior transesterification stage, a reaction mass is prepared by reacting BDO with a dimethyl ester in the presence of a transesterification catalyst.

The dimethyl ester used in the prior transesterification stage is selected from DMT, dimethyl isophthalate (hereinafter DMI), and mixtures thereof. To produce a reaction mass from which PBT oligomer will be prepared, the dimethyl ester of choice is DMT or a mixture of DMT and DMI wherein DMT is the dominant component; more preferably, it is DMT alone. To produce a reaction mass from which PBI oligomer will be prepared, the dimethyl ester of choice is DMI or a mixture of DMI and DMT wherein DMI is the dominant component; more preferably, it is DMI alone.

The transesterification catalyst used in the prior transesterification stage can be any of a variety of catalysts known to be useful in transesterification reactions. The preferred transesterification catalysts are organic titanates, especially tetraalkyl titanates, used alone or in combination with magnesium acetate or calcium acetate. Most preferred is tetrabutyl titanate. The organic titanates are used in amounts corresponding to 0.5–1.0 moles of organic titanate per 1000 moles of dimethyl ester. Other catalysts which can be used include complex titanates derived from alkali or alkaline earth metal alkoxides and titanate esters, inorganic titanates, such as lanthanum titanate, calcium acetate/antimony trioxide mixtures, and lithium and magnesium alkoxides.

In a preferred embodiment of the present invention, excess BDO should be fed into the prior transesterification stage. Most preferably, the excess is 10% or less. Excess BDO is calculated on the basis that one mole of BDO is required per mole of dimethyl ester in order to prepare a high molecular weight polymer. When the ratio of moles BDO:moles dimethyl ester is greater than 1:1, then excess BDO is present. For example, a feed of 1.05 moles of BDO per mole of dimethyl ester corresponds to a 5% excess of BDO.

Limiting the excess of BDO to 10% or less in the transesterification stage is advantageous in the present process because any excess BDO fed forward must be volatilized in later stages. Large excesses of BDO would therefore require that substantial amounts of heat be supplied to any column reactor to which the BDO is fed forward in order to vaporize the BDO. This is complicated, expensive, and more to the point, unnecessary since it has been found that if the methyl ester conversion is less than 85%, then the rate of exchange of methyl ester groups during the transesterification reaction shows little or no increase when the amount of excess BDO is raised from 2-3% to as high as 30%. Moreover, limiting the excess of BDO in the transesterification stage reduces the amount of BDO lost through the formation of THF. It has been found that when the excess BDO is limited to 10% or less in the transesterification stage, the loss of BDO to THF can be reduced to less than 1 mole of BDO per 100 moles of DMT and the total residence time required to prepare an oligomer (or prepolymer) of PBT suitable for continuous polycondensation can be less than 15 minutes. These results represent substantial improvements relative to prior art processes.

FIG. 1 includes a schematic of a continuous transesterification stage useful in the process of the present invention. The continuous transesterification process detailed in FIG. 1 makes use of a recirculating loop. More specifically, a continuous transesterification process is as follows: Vertical heat exchanger 5 establishes a flow in the loop by convection, with vapors, which consist of methanol, BDO, water, and THF, and heated reaction mass, which is comprised of BDO, DMT, catalyst, monomer, dimer, trimer, etc., continuously feeding via line 18 into the bottom of transesterification prereactor column 6 having internal plates. The vapors are separated from the reaction mass in the bottom of the column. Methanol formed by the transesterification reaction proceeds up transesterification prereactor column 6 as the principal component of the vapor. The reaction mass then recirculates continuously into line 19 to complete the loop.

Dimethyl ester is continuously fed into the loop via dimethyl ester feed line 1. Transesterification catalyst is also fed continuously into the loop via catalyst feed line 2. As described below in the section on the countercurrent column reactor system, BDO containing some methanol and traces of THF and water is introduced into the transesterification stage on one of the plates, preferably on one of the upper plates, of transesterification prereactor column 6 by means of line 20. BDO is continuously fed into transesterification prereactor column 6 from the countercurrent column reactor system, said reactor system being described in detail in section 2, below. Specifically, fresh BDO, preferably at a temperature slightly above its freezing point and more preferably at about 30° C.–60° C., most preferably 35° C.–45° C., is fed into the countercurrent column reactor system via feed line 3, with all or a major portion thereof entering absorber 9. Any BDO not fed to the absorber is fed to the transesterification prereactor column 6 via line 16. Also, BDO containing some methanol and traces of THF and water from the bottom of the absorber 9 is introduced into the transesterification prereactor column 6 via line 20. Methanol vapor containing minor amounts of THF and water exits overhead from the transesterification prereactor column 6 and is condensed in heat exchanger 7. The impure methanol condensed in heat exchanger 7 is split into two streams, one of which exits the system through line 15; and the other of which is returned as reflux to the top of column 6.

In preparing PBT or PBI from a dimethyl ester and BDO, the methyl ester groups of the dimethyl ester must be reduced to a very low level by transesterification with BDO to form an oligomer (or prepolymer) that has sufficient degree of polymerization and low enough volatility for introduction into a continuous polycondensation reactor. The continuous transesterification stage described above, along with other known continuous transesterification processes, is effective for converting the bulk of the methyl ester groups on the dimethyl ester but is relatively inefficient for completing the removal of the methyl ester groups and for yielding an oligomer (or prepolymer) having sufficient degree of polymerization to make it suitable for continuous polycondensation to high molecular weight polymer. Indicative of the inefficiency of a transesterification stage for completing methanol removal is the process of U.S. Pat. No. 4,499,261, wherein a total residence time of 130 minutes in two transesterification stages is required with a 30% excess of BDO to reach a conversion of 91%. Such a long residence time increases the losses of BDO to THF substantially.

At the same time, however, it is preferred in the present process that the conversion of methyl ester groups in the prior transesterification stage be 50-95%, more preferably 70-90%, and most preferably, 75-85%. In the most preferred continuous transesterification process described above with reference to FIG. 1, degrees of conversion of about 80% to about 88% can be achieved with transesterification reactor residence times of about 6-10 minutes with excess BDO of 2-10%. It is noted that while the preferred minimum degree of conversion of methyl ester groups is 50%, transesterification products with a lower degree of conversion of methyl ester groups would be suitable for feed into the countercurrent column reactor of the present invention. In fact, the first stage transesterification reaction could be bypassed entirely and the ingredients of said reaction could be fed directly into the countercurrent column reactor system. However, to do so would require that all the heat load for boiling methanol generated by the transesterification reaction would have to be provided by sidestream heat exchangers on the countercurrent column reactor. This is expensive and would require that the size of the countercurrent column reactor be substantially increased. Similarly, transesterification products having a degree of methyl ester conversion of greater than 95% are acceptable for feeding into the countercurrent column reactor described herein; however, such a higher degree of conversion generally requires increased residence time and as residence time increases, it is known that THF formation also increases.

2. Countercurrent Column Reactor System

By the process of the present invention, conversion of methyl ester groups to hydroxylbutyl endgroups and the building of molecular weight (which impacts in turn on a degree of polymerization and volatility) are efficiently and rapidly accomplished by a novel process wherein there is used a continuous countercurrent column reactor system. Since the continuous countercurrent column reactor system is operated at or slightly above atmospheric pressure, environmental contamination associated with a vacuum source is avoided. Further, since the continuous countercurrent column reactor system operates efficiently and rapidly, the loss of BDO to THF is minimized.

The continuous countercurrent column reactor system, and the process by which PBT oligomer or PBI oligomer (or prepolymer) is prepared from the reaction mass of the prior transesterification stage, is most easily described by reference to FIG. 1. In FIG. 1, a countercurrent column reactor is identified as 8. Stream 17, which is the reaction mass from a prior (i.e., upstream) transesterification stage, is continuously fed to the top plate of the countercurrent column reactor 8. The reaction mass flows downward through multiple reactor plates in the countercurrent column reactor and issues from the bottom of the countercurrent column reactor through line 14, which then carries the product (i.e., an oligomer of sufficient degree of polymerization for polycondensation) to a continuous polycondensation stage. The residence time of the reaction mass in the countercurrent column reactor is at least 5 minutes, preferably 6-10 minutes. Heat is applied to the countercurrent column reactor in order to maintain or increase the temperature of the liquid reaction mass flowing down the countercurrent column reactor. Heat may be applied to the countercurrent column reactor contents by various known methods. Heat could be applied in any of several places on or in the countercurrent column reactor. An example of an acceptable method for applying heat to the countercurrent column reactor 8 is illustrated in FIG. 1. In FIG. 1, a sidestream from the countercurrent column reactor 8 is removed by means of pump 12, which stream is heated by heat exchanger 13 and then returned to the countercurrent column reactor 8.

Countercurrent to the downward liquid flow of the reaction mass in the countercurrent column reactor is a stream of a heated inert gas, preferably nitrogen, which is continuously introduced at the bottom part of the countercurrent column reactor 8. The heated inert gas proceeds up the column and picks up increasing concentrations of volatiles, such as methanol, BDO, and minor amounts of THF and water, from the reaction mass flowing down the countercurrent column reactor. The inert gas plus the volatiles exits from the top part of the countercurrent column 8 and flows continuously into the bottom of an absorber 9 via line 21. An example of an absorber 9 that is adequate for this process is a packed tower having about two theoretical plates. Incoming BDO from line 3, at a temperature slightly above freezing, more preferably 30° C.-60° C., and most preferably 35° C.-45° C., continuously flows countercurrent to the inert gas containing the volatiles and scrubs out the methanol, THF, and water in the inert gas. The partial pressure of the BDO in the inert gas stream 22 after scrubbing is, as a result, lowered to a level corresponding to the relatively low temperature of the incoming BDO, which is lower than the temperature of the inert gas stream as it enters the absorber. The scrubbing of the inert gas containing volatiles in order to remove methanol, THF, and water is essential for the economical operation of the process since it permits the inert gas to be continuously recycled through the countercurrent column reactor system. Incidental losses of inert gas can be compensated for by addition of inert gas through line 4.

The inert gas after scrubbing next exits the absorber 9 and is compressed by a compressor 10, passed through a heat exchanger 11, and then reintroduced into the bottom of countercurrent column reactor 8. In an alternative method, the inert gas plus volatiles exiting the countercurrent column reactor 8 can be compressed by a compressor first and then passed into the absorber 9 for scrubbing as described above. Such an alternative method would result in more effective scrubbing than if the inert gas plus volatiles were not first compressed but it would demand higher amounts of energy than if the inert gas plus volatiles were scrubbed first.

It is not necessary that all of the BDO required by the process be fed to absorber 9. As shown in FIG. 1, a portion of the BDO may by-pass the absorber via a line 16 and be directly introduced into transesterification prereactor column 6. It is desirable that a major portion of the BDO be introduced to the process via absorber 9 so that the BDO, THF, water, and methanol are thoroughly removed from recycling inert gas. It is most preferred that the total BDO feed of the entire process, regardless of where said BDO is fed into the process, be such that the molar excess of BDO is less than 10%.

The reaction mass from the transesterification prereactor system fed to the countercurrent column reactor via line 17 should be introduced into the countercurrent column reactor at a temperature at least equivalent to the temperature of the reaction mass as it leaves the transesterification stage. It may be advantageous to heat the reaction mass to a higher temperature after it leaves the transesterification stage but before it enters the countercurrent column reactor.

The countercurrent column reactor should have about 6–12 plates. Examples of such plates include sieve plates, slot plates, or bubble cap plates. Bubble cap plates are preferred because they are less sensitive to variations in flow rate and viscosity. Because the reaction mass flowing down the column is increasing in viscosity, the plates may need to be modified, for instance, by reducing weir height and increasing the width of the slots in the bubble cap.

The flow of the heated inert gas into the bottom of the countercurrent column reactor should be sufficient to reduce the partial pressure of the butanediol at the bottom of the countercurrent column reactor to such an extent that an oligomer of sufficient molecular weight for subsequent polymerization reactions is produced. The range for acceptable flow rates depends upon column design and further, such flow rates are known in the art. If the flow rate is too low, the liquid in the column will "weep" through the holes in the plates of the column. If the flow rate is too high, entrainment flooding could occur. A short, large diameter column with few trays would have a higher optimal gas flow rate than a tall, smaller diameter column.

In general, it is recommended that the gas flow rate for the process of the present invention range from about 600–900 standard liters per kilogram of the reaction mass feed from the transesterification stage. However, as stated above, the gas flow rate is dependent upon the column design and as such, it should be determined for the particular column design being used in the process of the present invention.

The volume of recycled inert gas used per kilogram of transesterification stage reaction mass depends in part on the amount of excess BDO used in the transesterification stage and the concentration of methyl ester groups in the transesterification stage reaction mass. The greater the excess of BDO used in the transesterification reaction or the greater the concentration of methyl ester groups in the reaction mass, the greater should be the volume of the heated inert gas.

The inert gas stream is fed into the countercurrent column reactor at a minimum temperature of about 225° C., preferably 250° C.–260° C.

As shown in FIG. 1, only one transesterification stage precedes the countercurrent reactor stage. While a single transesterification stage is preferred, the use of two or more transesterification stages prior to the countercurrent reactor stage is meant to be included within the scope of this invention. The essence of this invention resides in the use of the countercurrent column reactor which has proven to be highly efficient for eliminating methyl ester groups from the transesterification reaction mass and at the same time for building sufficient molecular weight in the transesterification reaction mass to form a prepolymer (or oligomer) suitable for feeding to the final polycondensation stage. In turn, use of the countercurrent reactor is made practical by scrubbing of the inert gas stream in the absorber with incoming BDO. The efficiency of the process can be further enhanced by operating the transesterification stage such that an excess of BDO of 10% or less is used in the process.

As stated previously, the transesterification stage is known to be effective for converting the bulk of the methyl ester groups but it is relatively inefficient for completing the removal of methyl ester groups. It is preferred in the present process of the present invention that the conversion of methyl ester groups range from 50–95% in the reaction mass fed to the countercurrent column reactor since sufficient heat must be provided to vaporize the methanol formed within the countercurrent column reactor. As is the case with excessive amount of BDO, excess concentrations of methyl ester groups complicate the operation of the countercurrent column reactor because of the large amounts of heat which must be introduced into the reactor.

The oligomer (or prepolymer) produced in the countercurrent column reactor normally has a conversion of about 98.5% of methyl ester groups. It has a number average molecular weight of about 3000–4000 and an inherent viscosity of about 0.2 to 0.25, measured at 30° C. and at a concentration of 0.1 g/dl in m-cresol.

3. Polycondensation Reaction

The oligomer (or prepolymer) exiting the column reactor via line 14 is preferably fed directly to a continuous polycondensation reactor to prepare high molecular weight polymer. In order to prepare copolyetherester elastomers, the oligomer (or prepolymer) from the countercurrent column reactor is mixed with the desired amount of a poly(alkylene oxide) glycol, such as poly(tetramethylene oxide) glycol, until the two liquids form a single phase liquid, which is in turn introduced to a continuous polycondensation reactor. Typical continuous polycondensation reactors are well known in the art.

EXAMPLES

Example 1

A series of continuous transesterification reactions were run in which the principal variable studied was the effect of the BDO/DMT ratio on conversion of methyl ester groups. The transesterification reactor was a heated and insulated resin flask fitted with a stirrer. The agitation provided was sufficient that the transesterification reactor was substantially a constant composition continuous reactor. Feed streams, BDO, and DMI were metered by separate pumps and entered the top of the transesterification reactor. Because of its lower melting point, the use of DMI (in contrast to DMT) facilitated operation of the transesterification reactor. Tetrabutyl titanate catalyst was injected by a syringe pump into the BDO feed stream just prior to its entry into the transesterification reactor. Product was removed through an outlet centrally located on the bottom of the transesterification reactor and passed through a U-leg to a vertical tube, the height of which could be adjusted to control the level of the reaction mass in the reactor. Temperature in the transesterification reactor was controlled by varying the heat supplied by a heating mantle. Vapors from the transesterification reactor consisting largely of methanol, with some BDO and traces of THF, and water exited the reactor through an outlet in the top of the reactor, passed through a vacuum jacketed Vigreux column, and were condensed in a water-cooled condenser, which was vented to the atmosphere. Part of the condensate was returned as reflux to the Vigreux column by means of a reflux splitter. The rest of the condensed methanol was passed to a receiving flask.

The conditions used to make three runs differing mainly in BDO/DMI feed mole ratio and analyses of the resulting products are presented in Table I.

TABLE I

|  | Run | | |
| --- | --- | --- | --- |
|  | A | B | C |
| Average reactor temperature °C. | 196 | 189 | 193 |
| Average reactor residence time, min | 6.1 | 7.0 | 7.0 |
| BDO/DMI feed mole ratio | 1.34 | 1.20 | 1.00 |
| Tetrabutyl titanate, moles per 1000 moles DMI | 0.790 | 0.758 | 0.703 |
| Methyl ester conversation, % (a) | 81.0 | 81.1 | 80.7 |
| Moles BDO degraded to THF per 100 moles DMI (b) | 0.19 | 0.42 | 0.31 |

(a) Methyl ester conversion is the average of values determined by
(1) analysis of the bottoms product for residual methyl ester end groups and
(2) by calculation from the ratio of methanol take-off rate and DMI feed rate
(b) THF was determined by gas chromatography of the recovered methanol The results of the three runs showed that methyl ester conversions of about 81% were obtained with residence times of 6–7 minutes regardless of the BDO/DMI feed ratio, which Was varied from 1.00–1.34. THF formation was low for all three runs.

Substantially identical results would be obtained if DMI was replaced by an equal amount of DMT, due to the fact that, at the same temperature and catalyst concentration, the ester exchange rate of either with BDO is very nearly identical.

Example 2

This example illustrates the use of a continuous countercurrent column reactor system to convert the transesterification reaction mass from a prior transesterification stage to an oligomer (or prepolymer) suitable for feed to a continuous polycondensation reactor.

The countercurrent column reactor was a modified Oldershaw column of 28 mm diameter, 8 plates, 3 mm high weirs, tray spacing between 28 and 29 mm. The countercurrent column reactor was heated with a clamshell heater. The transesterification reaction mass from a transesterification reaction, described below, was fed to the top of the countercurrent column reactor. Heated nitrogen was introduced into the countercurrent column reactor below the bottom tray of the column. Finished oligomer (or prepolymer) was removed from the bottom of the countercurrent column reactor. After passage upward through the countercurrent column reactor, the nitrogen gas stream exited from the top of the countercurrent column reactor and was passed through cold traps to condense the volatile organics contained therein.

The transesterification reaction mass from a transesterification reaction fed to the column was prepared in the continuous transesterification reactor described in Example 1. A BDO/DMI feed mole ratio of 1.065 was used with a 7 minute residence time. The transesterification product (i.e., the transesterification reaction mass) had a methyl ester conversion of 81.25%. The molten transesterification reaction mass at a temperature of 262° C. was fed to the countercurrent column reactor at a rate of about 460 g/hr. The skin temperature of the countercurrent column reactor was maintained at about 264° C. by means of the clamshell heater. The temperature in the countercurrent column reactor at the uppermost level (above the uppermost tray) heated by the clamshell heater was about 262° C. Nitrogen was introduced into the bottom of the countercurrent column reactor at a rate of about 5 standard liters/min. This flow rate gave a ratio of about 750 liters of nitrogen per kilogram of transesterification product fed. The nitrogen was heated to about 244° C. before it was introduced into the countercurrent column reactor. The average residence time of liquid transesterification reaction mass in the countercurrent column reactor was estimated to be about 7 minutes.

The oligomer (or prepolymer) product from the countercurrent column reactor had a methyl ester conversion of 98.5 and an inherent viscosity of 0.2329 dl/g in m-cresol at a concentration of 0.1 g/dl. The number average molecular weight of the product was 3400, determined by gel permeation chromatography. This molecular weight corresponds to a degree of polymerization of 15. The product is suitable as feed to a continuous polycondensation reactor.

Substantially identical results would be obtained if the transesterification product fed to the column was based on DMT rather than DMI, due to the fact that, at the same temperature and catalyst concentration the ester exchange rate of either with BDO is very nearly identical.

We claim:

1. A continuous process for preparing poly(butylene terephthalate) oligomer or poly(butylene isophthalate) oligomer comprising the steps of
    (a) continuously feeding a reaction mass formed from a prior transesterification stage into the top part of a heated countercurrent column reactor wherein the reaction mass is prepared from a transesterification reaction between butanediol and a dimethyl ester selected from the group consisting of dimethyl terephthalate, dimethyl isophthalate, and mixtures thereof, in the presence of a transesterification catalyst,
    (b) continuously feeding into the bottom part of the heated countercurrent column reactor a stream of inert gas having a minimum temperature of 225° C.,
    (c) continuously passing the inert gas stream upward through the heated countercurrent column reactor and out the top part of the heated countercurrent column reactor into the bottom part of an absorber while the reaction mass is continuously flowing down and through the heated countercurrent column reactor, thereby forming an oligomer, at a flow rate such that the reaction mass has a residence time in the reactor of at least 5 minutes, (d) continuously feeding butanediol into the top part of the absorber at a temperature lower than that of the inert gas stream incoming at the bottom part of the absorber, (e) continuously passing the inert gas stream upward through the absorber and out the top part of the absorber into a compressor while the butanediol is continuously flowing downward through the absorber, (f) passing the inert gas stream from the compressor into a heat exchanger and recycling it into the bottom part of the countercurrent column reactor, (g) passing the butanediol out the bottom part of the absorber and into a butanediol feed line for use in the prior transesterification stage, and (h) collecting an oligomer of poly(butylene terephthalate) or an oligomer of poly(butylene isophthalate) from the bottom of the countercurrent column reactor.

2. The process of claim 1 wherein the reaction mass of step (a) is prepared from butanediol and a dimethyl ester wherein the molar ratio of butanediol:dimethyl ester is 1:1–1:1.1.

3. The process of claim 1 wherein dimethyl ester used to prepare the reaction mass of step (a) is dimethyl terephthalate.

4. The process of claim 1 wherein the transesterification catalyst used to prepare the reaction mass of step (a) is tetrabutyl titanate.

5. The process of claim 1 wherein the conversion of dimethyl ester groups in the reaction mass of step (a) is 50–95%.

6. The process of claim 1 wherein the conversion of dimethyl ester groups in the reaction mass of step (a) is 75–85%.

7. The process of claim 1 wherein the transesterification reaction mass of step (a) is fed into the countercurrent column reactor at a temperature at least as high as the temperature at which the transesterification reaction was conducted.

8. The process of claim 1 wherein the inert gas stream of step (b) is a nitrogen gas stream.

9. The process of claim 1 wherein the temperature of the stream of inert gas is 250° C.–260° C.

10. The process of claim 1 wherein the stream of inert gas has a flow rate in the countercurrent column reactor of 600–900 standard liters/kg of the reaction mass being fed into the countercurrent column reactor.

11. The process of claim 1 wherein the countercurrent column reactor has 6–12 internal plates.

12. The process of claim 11 wherein the internal plates are bubble cap plates.

13. The process of claim 1 wherein the temperature of the butanediol being fed into the absorber in step (d) is about 30° C. to 60° C.

14. A continuous process for preparing poly(butylene terephthalate) oligomer or poly(butylene isophthalate) oligomer comprising the steps of (a) continuously feeding a reaction mass formed from a prior transesterification stage into the top part of a heated countercurrent column reactor wherein the reaction mass is prepared from a transesterification reaction between butanediol and a dimethyl selected from the group consisting of dimethyl terephthalate, dimethyl isophthalate, and mixtures thereof, in the presence of a transesterification catalyst, (b) continuously feeding into the bottom part of the heated countercurrent column reactor a stream of inert gas having a minimum temperature of 225° C., (c) continuously passing the inert gas stream upward through the heated countercurrent column reactor and out the top part of the heated countercurrent column reactor into a compressor while the reaction mass is continuously flowing down and through the heated countercurrent column reactor, thereby forming an oligomer, at a flow rate such that the reaction mass has a residence time in the reactor of at least 5 minutes, (d) continuously passing the compressed inert gas from the countercurrent column reactor into the bottom part of an absorber while feeding butanediol into the top part of the absorber at a temperature lower than that of the compressed inert gas stream incoming at the bottom part of the absorber, (e) continuously passing the compressed inert gas stream upward through the absorber and out the top part of the absorber into a heat exchanger and recycling it into the bottom part of the countercurrent column reactor, (f) passing the butanediol out the bottom part of the absorber and into a butanediol feed line for use in the transesterification stage, and (g) collecting an oligomer of poly(butylene terephthalate) or an oligomer of poly(butylene isophthalate) from the bottom of the countercurrent column reactor.

* * * * *